(12) United States Patent
Cho et al.

(10) Patent No.: US 11,424,495 B2
(45) Date of Patent: Aug. 23, 2022

(54) BATTERY MODULE

(71) Applicant: LG Chem, Ltd., Seoul (KR)

(72) Inventors: Yoon Gyung Cho, Daejeon (KR); Eun Suk Park, Daejeon (KR); Sang Min Park, Daejeon (KR); Se Woo Yang, Daejeon (KR); Seong Kyun Kang, Daejeon (KR); Jae Hun Yang, Daejeon (KR); Jae Min Lee, Daejeon (KR); Kyung Yul Bae, Daejeon (KR); Young Gil Kim, Daejeon (KR); Gyu Jong Bae, Daejeon (KR)

(73) Assignee: LG Energy Solution, Ltd.

( * ) Notice: Subject to any disclaimer, the term of this patent is extended or adjusted under 35 U.S.C. 154(b) by 139 days.

(21) Appl. No.: 16/864,718

(22) Filed: May 1, 2020

(65) Prior Publication Data

US 2020/0274213 A1    Aug. 27, 2020

Related U.S. Application Data

(63) Continuation of application No. 15/735,446, filed as application No. PCT/KR2016/006232 on Jun. 13, 2016, now Pat. No. 11,038,223.

(30) Foreign Application Priority Data

Jun. 12, 2015    (KR) ........................ 10-2015-0083425

(51) Int. Cl.
*H01M 10/6551*    (2014.01)
*H01M 10/6554*    (2014.01)
(Continued)

(52) U.S. Cl.
CPC ..... *H01M 10/6551* (2015.04); *H01M 10/613* (2015.04); *H01M 10/625* (2015.04);
(Continued)

(58) Field of Classification Search
CPC ......... H01M 10/6555; H01M 10/6551; H01M 10/6557
See application file for complete search history.

(56) References Cited

U.S. PATENT DOCUMENTS

2011/0059347 A1    3/2011  Lee et al.
2011/0259564 A1   10/2011  Izutani et al.
(Continued)

FOREIGN PATENT DOCUMENTS

CN    203481341 U    3/2014
EP     2548933 A1    1/2013
(Continued)

OTHER PUBLICATIONS

Extended European Search Report including Written Opinion for EP16807871.5 dated Mar. 13, 2019.
(Continued)

*Primary Examiner* — Bethany L Martin
(74) *Attorney, Agent, or Firm* — Lerner, David, Littenberg, Krumholz & Mentlik, LLP

(57) ABSTRACT

The present application can provide a battery module, a method for manufacturing method the same and a thermally conductive material applied to the manufacturing method. The present application can provide a battery module having excellent output relative to volume and heat dissipation characteristics, with being manufactured in a simple process and at a low cost, a method for manufacturing the same, and a thermally conductive material applied to the manufacturing method.

18 Claims, 3 Drawing Sheets

(51) Int. Cl.
    *H01M 50/20*      (2021.01)
    *H01M 50/24*      (2021.01)
    *H01M 10/613*     (2014.01)
    *H01M 10/625*     (2014.01)
    *H01M 10/647*     (2014.01)
    *H01M 10/653*     (2014.01)
    *H01M 10/6568*    (2014.01)

(52) U.S. Cl.
    CPC ....... *H01M 10/647* (2015.04); *H01M 10/653* (2015.04); *H01M 10/6554* (2015.04); *H01M 10/6568* (2015.04); *H01M 50/20* (2021.01); *H01M 50/24* (2021.01); *H01M 2220/20* (2013.01)

(56)              References Cited

U.S. PATENT DOCUMENTS

| | | | | |
|---|---|---|---|---|
| 2012/0040222 | A1* | 2/2012 | Quick | H01M 10/6551 |
| | | | | 429/120 |
| 2012/0082887 | A1* | 4/2012 | Ninomiya | H01M 10/643 |
| | | | | 429/159 |
| 2012/0219838 | A1 | 8/2012 | Terada et al. | |
| 2012/0288725 | A1 | 11/2012 | Tanaka et al. | |
| 2012/0301769 | A1* | 11/2012 | Okada | H01M 10/6554 |
| | | | | 429/120 |
| 2012/0301771 | A1 | 11/2012 | Moser et al. | |
| 2013/0280565 | A1 | 10/2013 | Lee et al. | |
| 2013/0295422 | A1 | 11/2013 | Kim et al. | |
| 2014/0154547 | A1* | 6/2014 | Anderson | H01M 10/0413 |
| | | | | 429/120 |
| 2014/0234691 | A1 | 8/2014 | Lee et al. | |
| 2014/0363726 | A1* | 12/2014 | Honda | H01M 10/052 |
| | | | | 429/145 |
| 2015/0266387 | A1* | 9/2015 | Garfinkel | B60L 50/64 |
| | | | | 180/65.1 |
| 2015/0275061 | A1 | 10/2015 | Jeon et al. | |
| 2016/0288737 | A1* | 10/2016 | Kamimura | H01M 10/655 |

FOREIGN PATENT DOCUMENTS

| | | |
|---|---|---|
| JP | 2001098091 A | 4/2001 |
| JP | 200364266 A | 3/2003 |
| JP | 200884691 A | 4/2008 |
| JP | 2011009477 A | 1/2011 |
| JP | 2011108617 A | 6/2011 |
| JP | 201239062 A | 2/2012 |
| JP | 2014103123 A | 6/2014 |
| JP | 2014109024 A | 6/2014 |
| JP | 2014534597 A | 12/2014 |
| KR | 101145719 B1 | 5/2012 |
| KR | 20120051237 A | 5/2012 |
| KR | 20120086657 A | 8/2012 |
| KR | 20140037351 A | 3/2014 |
| KR | 20140043031 A | 4/2014 |
| KR | 20140074151 A | 6/2014 |
| KR | 20140110233 A | 9/2014 |
| KR | 101528007 B1 | 6/2015 |

OTHER PUBLICATIONS

Search provided in Chinese Office Action for CN201680034424.7 dated Dec. 10, 2019.

Search provided in Indian Office Action for IN201717044548 dated Sep. 27, 2019.

Search report from International Application No. PCT/KR2016/006232, dated Aug. 24, 2016.

Search Report in Chinese Office Action for CN201680034424.7 dated Dec. 10, 2019.

* cited by examiner

BATTERY MODULE

CROSS-REFERENCE TO RELATED APPLICATIONS

The present application is a continuation of U.S. patent application Ser. No. 15/735,446, filed on Dec. 11, 2017, which is a national phase entry under 35 U.S.C. § 371 of International Application No. PCT/KR2016/006232, filed Jun. 13, 2016, which claims the benefit of priority based on Korean Patent Application No. 10-2015-0083425 filed on Jun. 12, 2015, the disclosures of which are is herein incorporated by reference in their entireties.

TECHNICAL FIELD

The present application relates to a battery module.

BACKGROUND ART

A secondary battery includes a nickel cadmium battery, a nickel hydride battery, a nickel zinc battery, or a lithium secondary battery, the representative example of which is the lithium secondary battery.

The lithium secondary battery mainly uses lithium oxide and carbon materials as a positive electrode active material and a negative electrode active material, respectively. The lithium secondary battery includes an electrode assembly in which a positive electrode plate and a negative electrode plate coated with a positive electrode active material and a negative electrode active material, respectively, are disposed with sandwiching a separator between them, and an exterior material in which the electrode assembly is sealed and held together with an electrolyte, and according to types of the exterior material may be classified as a can type secondary battery and a pouch type secondary battery. In the present specification, a single secondary battery may be referred to as a battery cell.

When it is used in medium and large devices such as an automobile or a power storage device, a large number of battery cells may be electrically connected to each other to constitute a battery module or a battery pack for increasing capacity and output.

In order to constitute a battery module or a battery pack that such battery modules are multiply connected, various fastening parts or cooling equipments, and the like are required, where such fastening parts or cooling equipments cause an increase in the manufacturing cost of the battery module or the battery pack, increase volume and weight, and lower output relative to the increased volume and weight.

DISCLOSURE

Technical Problem

The present application can provide a battery module.

Technical Solution

The battery module of the present application may comprise a housing (hereinafter, the housing may be herein referred to as a module case) and a battery cell housed in the housing. In the present application, at least two or more battery cells may be housed in the housing. In the present application, an assembly of the two or more battery cells housed in the housing may be referred to as a battery cell assembly. FIG. 1 is for an exemplary battery module and illustratively shows a housing (200) and a battery cell assembly (100).

The housing may include at least a bottom plate. At least two convex portions for guiding the battery cell may be formed on the bottom plate. The battery cell may be mounted between the convex portions of the bottom plate.

FIG. 2 is a side view of an exemplary battery module, which shows a shape of the battery cell (400) mounted between the convex portions of the bottom plate (210) as mentioned above. The shape, specific number, size, and the like of the convex portions formed on the bottom plate are not particularly limited and may be appropriately selected considering the number or size of the battery cell to be mounted and the shape thereof.

The bottom plate may be a thermally conductive bottom plate. Since the convex portion formed on the bottom plate is also a part of the bottom plate, it may be thermally conductive. The term thermally conductive bottom plate means a bottom plate having a thermal conductivity of 10 W/mK or more, or including at least a region having the thermal conductivity as above. For example, the entire bottom plate, or at least the convex portion, may have the above described thermal conductivity. In another example, at least one of the bottom plate and/or the convex portion may comprise a region having the thermal conductivity. In another example, the thermal conductivity may be 20 W/mK or more, 30 W/mK or more, 40 W/mK or more, 50 W/mK or more, 60 W/mK or more, 70 W/mK or more, 80 W/mK or more, 90 W/mK or more, 100 W/mK or more, 110 W/mK or more, 120 W/mK or more, 130 W/mK or more, 140 W/mK or more, 150 W/mK or more, 160 W/mK or more, 170 W/mK or more, 180 W/mK or more, 190 W/mK or more, or 195 W/mK or more. The higher the value of the thermal conductivity is, the more advantageous it is in terms of the heat dissipation property of the module, and thus the upper limit is not particularly limited. In one example, the thermal conductivity may be about 1000 W/mK or less, 900 W/mK or less, 800 W/mK or less, 700 W/mK or less, 600 W/mK or less, 500 W/mK or less, 400 W/mK or less, 300 W/mK or less, or 250 W/mK or less, but is not limited thereto. The kind of materials exhibiting the thermal conductivity as above is not particularly limited, and for example, includes a metal material such as aluminum, gold, silver, tungsten, copper, nickel or platinum. The bottom plate may be made entirely of the thermally conductive material as above, or at least a region of the bottom plate may be made of the thermally conductive material. Accordingly, the bottom plate may have the above-mentioned range of thermal conductivity, or it may comprise at least the region having the aforementioned thermal conductivity.

In the bottom plate, the region having the above range of thermal conductivity may be a region in contact with a resin layer to be described below. In addition, the region having the thermal conductivity may be a region in contact with a cooling medium such as cooling water. According to this structure, a structure capable of effectively discharging the heat generated from the battery cell outside can be embodied.

In one example, the bottom plate may be in contact with a cooling system, such as a water cooling system. At this time, the contact is a thermal contact to be described below.

Furthermore, among physical properties mentioned in the present specification, when the measured temperature affects the physical properties, the physical properties may be physical properties measured at room temperature unless otherwise stated. In the present specification, the term room temperature may refer to any one temperature within the range of about 10° C. to 30° C., for example, a temperature of about 25° C., about 23° C., or about 20° C. or so.

The housing may further comprise one separate structure, at least including the bottom plate. For example, the housing may further comprise a sidewall, etc., forming an internal space, in which the assembly of the battery cells can be housed, together with the bottom plate. The structure of the housing is not particularly limited as long as it includes at least the bottom plate.

The battery module may further include a cooling fin and/or a cooling plate. In this case, the cooling fin may be positioned, for example, between the battery cells guided by the convex portions. At least the cooling fin may be present at the top of the convex portion. At this time, the cooling fin may be positioned between the battery cells in a state of covering the upper surface of the convex portion.

FIG. 2 illustratively shows a cooling fin (302) positioned between the battery cells (400) in a state of covering the upper surface of the convex portion in the bottom plate (210).

Furthermore, the cooling plate may also be positioned between the surface of the bottom plate, formed between the convex portions, and the battery cells. FIG. 2 illustratively shows such a cooling plate (301).

The battery module may comprise any one or both of the cooling fin and the cooling plate.

The cooling fin and/or the cooling plate may have a thermal conductivity in the same range as mentioned in the bottom plate, and thus may be made of a metal material such as aluminum, gold, pure silver, tungsten, copper, nickel or platinum like the bottom plate.

The number of battery cells in the housing is controlled by the desired output depending on a use of the battery module and the like, without being particularly limited. The battery cells may be electrically connected to each other.

The type of the battery cell is not particularly limited, and various known battery cells can all be applied. In one example, the battery cell may be a pouch type battery. Referring to FIG. 3, the pouch type battery (100) may typically comprise an electrode assembly, an electrolyte and a pouch exterior material. FIG. 3 is an exploded perspective view schematically showing the configuration of an exemplary pouch type battery, and FIG. 4 is an assembled perspective view of the configuration of FIG. 3.

The electrode assembly (110) included in the pouch type battery (100) may be a shape that at least one positive electrode plate and at least one negative electrode plate are disposed with sandwiching a separator between them. The electrode assembly (110) may be classified as a winding form in which one positive electrode plate and one negative electrode plate are wound together with a separator, or a stacking form in which a plurality of positive electrode plates and a plurality of negative electrode plates are alternately laminated with sandwiching a separator between them.

The pouch exterior material (120) may be configured in the form of, for example, an external insulating layer, a metal layer, and an internal adhesive layer. Such an exterior material (120) may comprise a thin film of metal such as aluminum by protecting internal elements such as the electrode assembly (110) and the electrolyte, compensating the electrochemical properties of the electrode assembly (110) and the electrolyte and considering heat dissipation. Such a metal thin film may be interposed between insulating layers formed of an insulating material in order to secure electrical insulation of the film with elements such as the electrode assembly (110) and the electrolyte or other elements outside the battery (100).

In one example, the exterior material (120) may comprise an upper pouch (121) and a lower pouch (122), and in at least one of the upper pouch (121) and the lower pouch (122) an internal space (I) having a concave form may be formed. The electrode assembly (110) can be housed in the internal space (I) of such a pouch. Sealing portions (S) are provided on the outer peripheries of the upper pouch (121) and the lower pouch (122) and these sealing portions (S) are adhered to each other so that the internal space accommodating the electrode assembly (110) can be sealed.

Each electrode plate of the electrode assembly (110) is provided with an electrode tab, and one or more electrode tabs may be connected to an electrode lead. The electrode lead is interposed between the sealing portions (S) of the upper pouch (121) and the lower pouch (122) and exposed outside the exterior material (120), so that it can function as an electrode terminal of the secondary battery (100).

However, the shape of the above described pouch type battery is one example, and the battery cell which is applied to the present application is not limited to the above type. In the present application, various types of known pouch type batteries or other types of batteries can be all applied as battery cells.

The battery module may further comprise a resin layer, for example, a resin layer having a thermal conductivity of 2 W/mK or more. The resin layer may be present in at least one region among between the cooling fin and the convex portion, specifically, between the region of the cooling fin covering the upper surface of the convex portion, and the convex portion, between the cooling plate and the bottom plate, between the cooling fin and the battery cell or between the cooling plate and the battery cell. The resin layer may be in contact with the cooling fin, the cooling plate, the convex portion, the bottom plate, and/or the battery cell. In this case, the contact is a thermal contact. The term thermal contact may mean the case where heat can be transferred from any one target to other targets even if a space is present between the resin layer and the cooling fin, the cooling plate, the convex portion, the bottom plate and/or the battery cell to a certain extent.

Such a resin layer may cover at least about 10%, at least about 15%, at least about 20%, at least about 25%, at least about 30%, at least about 35%, at least about 40%, at least about 45%, at least about 50% or at least about 55% of the entire area of the bottom plate. At least, the resin layer may cover the above described convex portion of the bottom plate. The upper limit of the area of the resin layer is not particularly limited, and is, for example, about 100%.

In the present application, the term resin layer is a layer containing a resin component, and in one example, the resin layer may be also an adhesive layer. In one example, the battery module comprises the bottom plate, the battery cell, the cooling fin and the cooling plate, and comprises the resin layer in contact with both between the cooling fin and the bottom plate and/or between the bottom plate and the cooling plate. Furthermore, the contact means the above described thermal contact, which may mean a state in which the resin layer is in direct contact with the bottom plate or the like, or other elements, for example an insulating layer and the like, are present between the resin layer and the bottom plate or the like, but the other elements do not disturb transferring heat from the resin layer to the bottom plate or the like. To do not disturb transferring heat as above means the case that even if other elements (e.g., an insulating layer)

are present between the resin layer and the bottom plate or the like the total thermal conductivity of the other elements and the resin layer is about 1.5 W/MK or more, about 2 W/mK or more, 2.5 W/mK or more, 3 W/mK or more, 3.5 W/mK or more, or 4 W/mK or more, or the total thermal conductivity of the resin layer and the bottom plate or the like in contact with this is included within the above range even if the other elements are present. The thermal conductivity of the thermal contact may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. If other elements are present, this thermal contact can be achieved by controlling the thermal conductivity and/or thickness of the other elements.

The resin layer may also be present between the cooling fin and/or the cooling plate and the battery cell, if necessary.

The present application can embody a module housing more battery cells per unit volume through adopting the above structure, with greatly reducing various fastening parts or cooling equipments of the module which have been conventionally required on constructing general battery modules or battery packs as an assembly of such modules and securing heat dissipation properties. Accordingly, the present application can provide a battery module that is smaller and lighter, and has higher output.

As described above, the thermally conductive region or the thermally conductive bottom plate or the like may be a region in contact with a cooling medium such as cooling water.

The resin layer may be in the form of a thin layer or may fill a space between the bottom plate and the cooling fin and/or the cooling plate or the like. The thickness of the resin layer can be, for example, in the range of about 100 μm to 5 mm or in the range of about 200 μm to 5 mm. The structure of the present application has advantageous heat dissipation characteristics, if the resin layer is thin, and advantageous insulation characteristics, if it is thick, and thus in consideration of this point, the appropriate thickness may be set. The thickness may be a thickness of the thinnest region, a thickness of the thickest region, or an average thickness in the resin layer.

The resin layer or the battery module to which the resin layer is applied may have at least one physical property of physical properties to be described below. Each physical property to be described below is independent, and any one physical property does not take priority over other physical properties, and the resin layer can satisfy at least one or two or more of physical properties described below.

For example, the resin layer is a thermally conductive resin layer, which may have a thermal conductivity of about 2 W/mK or more, 2.5 W/mK or more, 3 W/mK or more, 3.5 W/mK or 4 W/mK or more. The thermal conductivity may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. When the resin layer is a thermally conductive resin layer as above, the bottom plate and the like to which the resin layer is attached may be a region having the above described thermal conductivity of 10 W/mK or more. At this time, the region of the module case representing the thermal conductivity may be a region in contact with a cooling medium, for example, cooling water or the like. The thermal conductivity of the resin layer is, for example, a value measured according to ASTM D5470 standard or ISO 22007-2 standard. A method for setting the thermal conductivity of the resin layer in the above range is not particularly limited. For example, the thermal conductivity of the resin layer can be controlled through the type of the resin used in the resin layer and/or use of fillers. For example, among resin components generally known to be usable as adhesives, it is known that acrylic resins, urethane resins and silicone resins have similar heat conduction properties to each other, epoxy resins have excellent thermal conductivity compared to them, and olefin resins have high thermal conductivity over epoxy resins. Therefore, if necessary, it is possible to select one having an excellent thermal conductivity from the resins. However, in general, the desired thermal conductivity is hardly secured by only the resin component, and it is also possible to apply a method in which the filler component having excellent thermal conductivity is contained in the resin layer at an appropriate ratio as described below.

The resin layer or the battery module to which the resin layer is applied may have a thermal resistance of 5 K/W or less, 4.5 K/W or less, 4 K/W or less, 3.5 K/W or less, 3 K/W or less, or about 2.8 K/W. When the resin layer or the battery module to which the resin layer is applied is adjusted so as to exhibit such a range of thermal resistance, excellent cooling efficiency or heat dissipation efficiency can be secured. A method for measuring the thermal resistance is not particularly limited. For example, it can be measured according to ASTM D5470 standard or ISO 22007-2 standard.

The resin layer can have an appropriate adhesive force in consideration of effective fixing of the battery cells, and impact resistance and vibration resistance in the process of using the module. In one example, the resin layer may have an adhesive force of about 1,000 gf/10 mm or less, about 950 gf/10 mm or less, about 900 gf/10 mm or less, about 850 gf/10 mm or less, about 800 gf/10 mm or less, about 750 gf/10 mm or less, about 700 gf/10 mm or less, about 650 gf/10 mm or less, or about 600 gf/10 mm or less. In another example, the adhesive force of the resin layer may be about 50 gf/10 mm or more, about 70 gf/10 mm or more, about 80 gf/10 mm or more, or about 90 gf/10 mm or more. The adhesive force may be a value measured at a peel rate of about 300 mm/min and a peel angle of 180 degrees. In addition, the adhesive force may be an adhesive force to the module case in contact with the resin layer. For example, when an insulating layer is formed between the bottom plate or the like in contact with the resin layer in the module case and the resin layer as described below, the adhesive force to the module case may be an adhesive force to the module case on which the insulating layer is formed. If such an adhesive force can be secured, an excellent adhesive force can be represented for various materials, for example, various materials such as a case and a battery cell or the like included in a battery module. If such a range of the adhesive force is secured, a volume change during charging and discharging of the battery cell in the battery module, a change of the operating temperature in the battery module or peeling by hardening and shrinking the resin layer may be prevented to secure excellent durability. Such an adhesive force can be ensured by, for example, constituting the resin layer as an adhesive layer. That is, the adhesive force that a known adhesive material can exhibit is well known, whereby a material can be selected in consideration of such an adhesive force.

It may be required that the resin layer is formed such that it cannot be detached or peeled off from the module case of the battery module or the battery cells or cracks cannot be generated after a thermal shock test, for example a thermal shock test repeating 100 cycles, one cycle of which comprises holding it at a low temperature of about −40° C. for 30 minutes and then again holding it for 30 minutes with raising the temperature to 80° C. For example, when the battery module is applied to a product, such as an automobile, requiring a long warranty period (in the case of the automobile, at least about 15 years), the same level of performance as above may be required to secure durability.

The resin layer may be an electrically insulating resin layer. In the above described structure, the resin layer may exhibit electrical insulation to maintain the performance of the battery module and to secure stability. The electrically insulating resin layer may have a breakdown voltage of about 3 kV/mm or more, about 5 kV/mm or more, about 7 kV/mm or more, 10 kV/mm or more, 15 kV/mm or more, or 20 kV/mm or more, measured according to ASTM D149. The higher the value of the breakdown voltage, the resin layer shows more excellent insulation, without being particularly limited, but it may be about 50 kV/mm or less, 45 kV/mm or less, 40 kV/mm or less, 35 kV/mm or less, or 30 kV/mm or less in consideration of composition of the resin layer and the like. The breakdown voltage may also be controlled by controlling insulation of the resin component in the resin layer and, for example, the breakdown voltage can be controlled by applying insulating fillers in the resin layer. In general, among the thermally conductive fillers, ceramic fillers as described below are known as a component capable of ensuring insulation.

As the resin layer, a flame retardant resin layer can be applied in consideration of stability. In the present application, the term flame retardant resin layer may mean a resin layer showing a V-0 grade in UL 94 V Test (Vertical Burning Test). This can ensure stability against fire and other accidents that may occur in the battery module.

The resin layer may have a specific gravity of 5 or less. In another example, the specific gravity may be 4.5 or less, 4 or less, 3.5 or less, or 3 or less. The resin layer showing such a range of the specific gravity is advantageous for manufacturing a battery module which is lighter. The lower the specific gravity, the more advantageous the module lightening is, and thus the lower limit is not particularly limited. For example, the specific gravity may be about 1.5 or more, or 2 or more. In order for the resin layer to show the specific gravity in the same range as above, the components added to the resin layer can be adjusted. For example, when thermally conductive fillers are added, fillers capable of securing the desired thermal conductivity even at a low specific gravity, if possible, that is, a method for applying fillers having its own low specific gravity or applying surface-treated fillers may be used.

It is appropriate that the resin layer contains no volatile substance, if possible. For example, the resin layer may have a ratio of non-volatile components of 90% by weight or more, 95% by weight or more, or 98% by weight or more. In the above, the non-volatile components and the ratio thereof can be specified in the following manner. That is, the non-volatile content can be defined as the remaining portion after maintaining the resin layer at 100° C. for about 1 hour, and thus the ratio can be measured based on the initial weight of the resin layer and a ratio after maintaining it at 100° C. for about 1 hour.

In addition, the resin layer will have excellent resistance to deterioration, if necessary, but it may be required to have stability in which the surface of the module case or the battery cell does not react as chemically as possible.

It may be also advantageous that the resin layer has a low shrinkage ratio during curing or after curing. This can prevent peeling or void generation which may occur in processes of manufacturing and using the module. The shrinkage ratio can be appropriately adjusted within a range capable of exhibiting the above described effect, and, for example, it can be less than 5%, less than 3%, or less than about 1%. The lower the value of the shrinkage rate is, the more advantageous it is, and thus the lower limit is not particularly limited.

It may be also advantageous that the resin layer has a low coefficient of thermal expansion (CTE). This can prevent peeling or void generation which may occur in processes of manufacturing and using the module. The coefficient of thermal expansion can be appropriately adjusted within a range capable of exhibiting the above described effect, and, for example, it can be less than 300 ppm/K, less than 250 ppm/K, less than 200 ppm/K, less than 150 ppm/K or less than about 100 ppm/K. The lower the value of the coefficient of thermal expansion is, the more advantageous it is, and thus the lower limit is not particularly limited.

The tensile strength of the resin layer can be appropriately adjusted, whereby it is possible to provide a module showing appropriate durability by ensuring excellent impact resistance and the like. The tensile strength can be adjusted, for example, in the range of about 1.0 MPa or more.

The elongation of the resin layer can be appropriately adjusted, whereby it is possible to provide a module showing appropriate durability by ensuring excellent impact resistance and the like. The elongation can be adjusted, for example, in the range of about 10% or more or about 15% or more.

It may be advantageous that the resin layer exhibits an appropriate hardness. For example, if the hardness of the resin layer is too high, the resin layer may become excessively brittle to adversely affect the reliability. In addition, through control of the hardness of the resin layer, the impact resistance and the vibration resistance can be secured, and the durability of the product can be secured. The resin layer may have a hardness in Shore A type of, for example, less than 100, 99 or less, 98 or less, 95 or less, or 93 or less, or a hardness in Shore D type of less than about 80, about 70 or less, about 65 or less or about 60 or less. The lower limit of the hardness is not particularly limited. For example, the hardness in Shore A type may be 60 or more, or the hardness in Shore 00 type may be 5 or more or about 10 or more. The hardness of the resin layer generally depends on the type and the ratio of the filler contained in the resin layer, and if an excessive amount of the filler is contained, the hardness is usually increased. However, the resin component included in the resin layer also affects the hardness, as the silicone resins generally show a lower hardness over other resins such as epoxy or urethane.

The resin layer may also have a 5% weight loss temperature in a thermogravimetric analysis (TGA) of 400° C. or more, or an 800° C. remaining amount of 70% by weight or more. This characteristic can further improve the stability of the battery module at a high temperature. In another example, the 800° C. remaining amount may be at least about 75% by weight, at least about 80% by weight, at least about 85% by weight, or at least about 90% by weight. In another example, the 800° C. remaining amount may be about 99% by weight or less. The thermogravimetric analysis (TGA) can be carried out within a range of 25° C. to 800° C. at a rate of temperature increase of 20° C./min under a nitrogen (N2) atmosphere of 60 cm3/min. The thermogravimetric analysis (TGA) results can also be achieved through controlling the composition of the resin layer. For example, the 800° C. remaining amount depends on the type and proportion of the filler contained in the resin layer, and if an excess amount of the filler is contained, the remaining amount increases. However, since silicone resins generally have higher heat resistance than other resins such as epoxy or urethane, the remaining amount is higher and the resin component included in the resin layer also affects its hardness.

If the battery cell can be effectively fixed and, if necessary, the above-mentioned physical properties can be given, it is not particularly limited and all the known curable resin materials can be used. The material that can be used may include acrylic resins, epoxy resins, urethane resins, olefin resins, urethane resins, EVA (ethylene vinyl acetate) resins or silicone resins and the like, and thus the resin layer may comprise the resin. The resin layer may comprise the resin as a main component of the resin components. That is, the acrylic resin, the epoxy resin, the urethane resin, the olefin resin, the urethane resin, the ethylene vinyl acetate (EVA) resin, the silicone resin or the like may be contained in an amount of about 70% or more, about 75% or more, about 80% or more, about 85% or more or about 90% or more on the basis of weight. The ratio may be about 99% or less or about 95% or less.

A material for forming the resin layer, that is, a resin composition may be an adhesive material as described above and may be a solvent type, an aqueous type or a solvent-free type, but it may be appropriate that the resin composition is a solvent-free type in consideration of the convenience of a manufacturing process to be described below.

The resin layer material may be an active energy ray curable type, a moisture curable type, a thermosetting type or an ambient temperature curable type, and it may be suitably an ambient temperature curable type in consideration of the convenience of a manufacturing process to be described below.

The resin layer may include fillers in consideration of thermal conductivity, insulation, heat resistance (TGA analysis) or specific gravity, and the like, as described above. The use of appropriate fillers can ensure the above described range of the thermal conductivity and the like. In one example, the filler may be thermally conductive fillers. In the present application, the term thermally conductive filler means a material having a thermal conductivity of at least about 1 W/mK, at least about 5 W/mK, at least about 10 W/mK, or at least about 15 W/mK. The thermal conductivity of the thermally conductive filler may be about 400 W/mK or less, about 350 W/mK or less, or about 300 W/mK or less. The kind of the usable thermally conductive filler is not particularly limited, but ceramic fillers can be applied in consideration of insulation and the like. For example, ceramic particles such as alumina, MN (aluminum nitride), BN (boron nitride), silicon nitride, SiC or BeO may be used. In addition, if the insulating properties of the resin layer can be ensured, it may be also considered to apply carbon fillers such as graphite. The shape and ratio of the filler contained in the resin layer are not particularly limited and they may be selected in consideration of the viscosity of the resin composition, the possibility of settling in the resin layer, the desired heat resistance and thermal conductivity, insulation, filling effect or dispersion and the like. Generally, the larger the size of the filler, the viscosity of the resin composition increases and the possibility of settling the filler in the resin layer increases. Also, the smaller the size, the thermal resistance tends to be increased. Therefore, a suitable type of filler may be selected in consideration of the above points, and two or more fillers may be used, if necessary. In addition, considering the filling amount, it is advantageous to use spherical fillers, but fillers in the form of needle or plate can be also used in consideration of network formation and conductivity. In one example, the resin layer may comprise thermally conductive fillers having an average particle diameter within a range of 0.001 μm to 80 μm. In another example, the average particle diameter of the filler may be 0.01 μm or more, 0.1 μm or more, 0.5 μm or more, 1 μm or more, 2 μm or more, 3 μm or more, 4 μm or more, 5 μm or more or about 6 μm or more. In another example, the average particle diameter of the filler may be about 75 μm or less, about 70 μm or less, about 65 μm or less, about 60 μm or less, about 55 μm or less, about 50 μm or less, about 45 μm or less, about 40 μm or less, about 35 μm or less, about 30 μm or less, about 25 μm or less, about 20 μm or less, about 15 μm or less, about 10 μm or less, or about 5 μm or less.

The ratio of the filler contained in the resin layer can be selected in consideration of the characteristics of the resin layer, such that the above described characteristics, for example, thermal conductivity, insulation, and the like can be secured. For example, the filler may be contained within a range of about 50 to 2,000 parts by weight based on 100 parts by weight of the resin components in the resin layer. In another example, the part by weight of the filler may be at least about 100 parts by weight, at least about 150 parts by weight, at least about 200 parts by weight, at least about 250 parts by weight, at least about 300 parts by weight, at least about 350 parts by weight, at least about 400 parts by weight, at least about 500 parts by weight, at least about 550 parts by weight, at least about 600 parts by weight, or at least about 650 parts by weight.

The resin layer may further comprise a viscosity modifier, for example, a thixotropic agent, a diluent, a dispersant, a surface treatment agent, or a coupling agent, if necessary, for adjusting viscosity, for example, for raising or lowering viscosity or for controlling viscosity according to a shear force.

The thixotropic agent can control the viscosity according to the shear force of the resin composition to effectively perform the manufacturing process of the battery module. As the usable thixotropic agent, fumed silica and the like can be exemplified.

The diluent or dispersant is usually used for lowering the viscosity of the resin composition, and various agents known in the art can be used without limitation as long as they can exhibit the above action.

The surface treatment agent is used for surface treatment of the filler introduced into the resin layer, and various agents known in the art can be used without limitation as long as they can exhibit the above action.

The coupling agent can be used, for example, to improve dispersibility of the thermally conductive filler such as alumina, and various agents known in the art can be used without limitation as long as they can exhibit the above action.

The resin layer may further comprise a flame retardant or a flame retardant aid. Such a resin layer can form a flame retardant resin layer. As the flame retardant, various flame retardants known in the art can be applied without any particular limitation and, for example, a solid filler type flame retardant or a liquid flame retardant can be applied. An example of the flame retardant includes an organic flame retardant such as melamine cyanurate and an inorganic flame retardant such as magnesium hydroxide, but is not limited thereto.

If the amount of fillers filled in the resin layer is large, a liquid type flame retardant (TEP, triethyl phosphate, or TCPP, tris(1,3-chloro-2-propyl) phosphate, etc.) may be also used. In addition, a silane coupling agent capable of acting as a flame retardant synergist may be also added.

The resin layer may comprise any one or two or more of the above components.

In one example, the battery module may further comprise an insulating layer between the bottom plate and the battery cell or between the resin layer and the bottom plate, the cooling fin and/or the cooling plate. By adding an insulating layer, it is possible to prevent problems such as an electrical short circuit phenomenon or an outbreak of fire according to contact between the cell and the case due to an impact that may occur in the use process. The insulating layer may be formed by using an insulating sheet having high insulation and thermal conductivity or by applying or injecting a material exhibiting insulation. For example, in the method for manufacturing a battery module to be described below, a process of forming an insulating layer may be performed before injecting the resin composition. A so-called TIM (Thermal Interface Material) or the like may be applied to the formation of the insulating layer. Alternatively, the insulating layer may be formed with an adhesive material and, for example, the insulating layer may be also formed using a resin layer having little or no content of fillers such as thermally conductive fillers. As the resin component that can be used for forming the insulating layer, an acrylic resin, PVC (poly(vinyl chloride)), an olefin resin such as PE (polyethylene), an epoxy resin, silicone, or a rubber component such as an EPDM (ethylene propylene diene monomer) rubber and the like may be exemplified, without being limited thereto. The insulating layer may have a breakdown voltage of at least about 5 kV/mm, at least about 10 kV/mm, at least about 15 kV/mm, at least 20 kV/mm, at least 25 kV/mm, or at least 30 kV/mm, as measured according to ASTM D149. The higher the value of the breakdown voltage, the more excellent insulation is shown, without being particularly limited. For example, the breakdown voltage of the insulating layer may be about 100 kV/mm or less, 90 kV/mm or less, 80 kV/mm or less, 70 kV/mm or less or 60 kV/mm or less. A thickness of the insulating layer may be appropriately set in consideration of insulation or thermal conductivity of the insulating layer and, for example, be about 5 μm or more, about 10 μm or more, 20 μm or more, 30 μm or more, 40 μm or more, 50 μm or more, 60 μm or more, 70 μm or more, 80 μm or more or 90 μm or more. The upper limit of thickness is not particularly limited and may be, for example, about 1 mm or less, about 200 μm or less, 190 μm or less, 180 μm or less, 170 μm or less, 160 μm or less or 150 μm or less.

The present application also relates to a method for manufacturing a battery module, for example, the above-mentioned battery module.

The method for manufacturing the above module is not particularly limited, and may comprise a step of housing the cooling fin and/or the cooling plate and the battery cells after forming the resin composition layer on the surface of the bottom plate, at least on the convex portion with the above-mentioned resin composition. A step of curing the resin composition may be further performed at an appropriate time during the above process.

In the present application, the term resin composition may mean a state of the resin layer before curing, and the term resin layer may mean a state of the resin layer after curing.

The method for forming the resin composition layer on the bottom plate is not particularly limited and can be carried out in a known manner.

In the above, the kind of the resin composition is not particularly limited, and a suitable resin composition capable of exhibiting the desired physical properties can be selected.

For example, the injected resin composition above may be a resin composition capable of satisfying the physical properties such as the above-mentioned thermal conductivity or forming a resin layer comprising components for the properties.

Such a resin composition may be a resin composition of a solvent type, an aqueous type or a solvent-free type, as described above, and may be suitably a solvent-free type resin composition.

In addition, the resin composition may be a resin composition of an active energy radiation curable type, a moisture curable type, a thermosetting type or an ambient temperature curable type and the like, and may be suitably an ambient temperature curable type resin composition.

The resin composition may be a resin composition comprising at least one of various additives such as the above-mentioned thermally conductive fillers.

Such a resin composition may be constituted by one-component type, two-component type or three-component type and the like.

Such a resin composition can be cured, if necessary, where the method for curing the resin composition is not particularly limited.

For example, the above step may be performed by a method for irradiating the resin composition with active energy rays such as ultraviolet when the resin composition is an active energy ray curable type, a method for maintaining it under an appropriate moisture in the case of the moisture curable type, a method for applying an appropriate heat to it in the case of the heat curable type or a method for maintaining it at room temperature in the case of the ambient temperature curable type or the like.

In addition, heat may be also applied for a short period so as to be, for example, about 40° C. to 50° C. in a condition that does not affect stability of the battery cell in terms of tack time and processability before or during curing or before or during housing the battery cell.

The present application also relates to a resin composition that can be used in the manufacturing method or in forming the battery module of the above-mentioned structure.

As described above, the resin composition is not particularly limited as long as the battery cell can be effectively fixed and, if necessary, the above-mentioned physical properties can be given, and all the known resin compositions can be used.

Such a resin composition may include, but is not limited to, an acrylic resin composition, an epoxy resin composition, a urethane resin composition, an olefin resin composition, a urethane resin composition, an EVA (ethylene vinyl acetate) resin composition or a silicone resin composition.

The resin composition may be a solvent type resin composition, an aqueous resin composition, or a solvent-free type resin composition, and may suitably be a solvent-free resin composition.

The resin composition may be an active energy ray curable resin composition, a moisture curable resin composition, a thermosetting resin composition or an ambient temperature curable resin composition, and may suitably be an ambient temperature curable resin composition.

For example, the resin composition prepared by adding an additive such as the above-mentioned filler to a resin composition capable of forming acrylic adhesives, epoxy adhesives, urethane adhesives, olefin adhesives, EVA (ethylene vinyl acetate) adhesives or silicone adhesives in an appropriate amount in consideration of the desired physical properties may be applied to the above-mentioned method.

The resin composition as above may comprise a radical initiator and a catalyst thereof in consideration of curability at room temperature and the like. For example, the resin composition may comprise an acyl peroxide initiator such as benzoyl peroxide and a catalyst for the initiator, such as a toluidine compound, whereby a suitable curing system may be embodied.

The resin composition may comprise various components, if necessary, in addition to the above components.

The present application also relates to a battery pack, for example, a battery pack comprising two or more of the above-described battery modules. In the battery pack, the battery modules may be electrically connected to each other. A method for electrically connecting two or more battery modules to form a battery pack is not particularly limited, and all the known methods may be applied.

The present application also relates to a device comprising the battery module or the battery pack. An example of such a device may include an automobile such as an electric car, but is not limited thereto, and may include all applications requiring secondary batteries as outputs. For example, a method for constructing the automobile using the battery module or the battery pack is not particularly limited, and a general method can be applied.

Advantageous Effects

The present application can provide a battery module having excellent output relative to volume and heat dissipation characteristics, with being manufactured in a simple process and at a low cost, a method for manufacturing the same, and a resin composition applied to the manufacturing method.

DESCRIPTION OF REFERENCE NUMERALS

Figure 1:
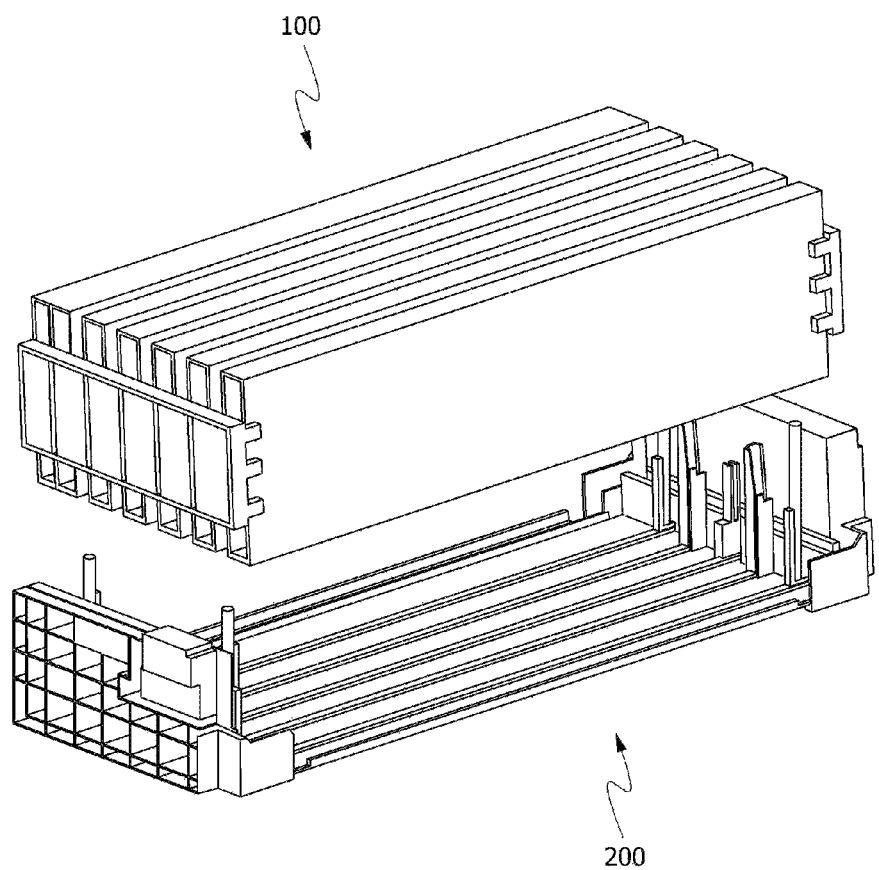
FIGS. 1 and 2 are views showing the structure of an exemplary battery module.

100: battery cell assembly
200: housing
210: bottom plate
301: cooling plate
302: cooling fin
400: battery cell
100: pouch type battery
110: electrode assembly
120: exterior material
121: upper pouch
122: lower pouch
S: sealing portion

MODE FOR INVENTION

Hereinafter, a battery module according to the present application will be described with reference to examples and comparative examples, but the scope of the present application is not limited by the scope set out below.

1. Evaluation Method for Thermal Conductivity of Resin Layer

The thermal conductivity of the resin layer was measured according to ASTM D5470 standard. That is, according to the standard of ASTM D5470, a resin layer was positioned between two copper bars and then, after contacting one of the two copper with a heater and contacting the other with a cooler, the heater was maintained at a constant temperature and the capacity of the cooler was adjusted to create a thermal equilibrium state (a state showing a temperature change of about 0.1° C. or less for 5 minutes). The temperature of each copper bar was measured in the thermal equilibrium state, and the thermal conductivity (K, unit: W/mK) was evaluated according to the following equation. On evaluating the thermal conductivity, the pressure applied to the resin layer was adjusted to be about 11 Kg/25 cm$^2$ and the thermal conductivity was calculated based on the final thickness when the thickness of the resin layer was changed during the measurement.

$$K=(Q \times dx)/(A \times dT) \qquad \text{<Thermal Conductivity Equation>}$$

In the above equation, K is the thermal conductivity (W/mK), Q is heat moving per unit time (unit: W), dx is the thickness (unit: m) of the resin layer, A is the cross sectional area (unit: m2) of the resin layer, and dT is the temperature difference (unit: K) of the copper bars.

2. Evaluation Method for Specific Gravity

The specific gravity of the resin layer was measured according to ASTM D792 standard. For example, according to the above standard, after measuring the weight of the resin layer and again measuring the weight in water, the density and specific gravity may be calculated through the difference in the measured weights, or after putting a predetermined amount of powder or pellet (for example, about 5 g) into the already measured volume in the pyrometer, the specific gravity may be calculated at 73.4F° through the difference of the weight and the volume.

3. Thermogravimetric Analysis (TGA) Method

The thermogravimetric analysis was performed using a TA400 instrument from TA Instrument. Analysis was carried out using about 10 mg of the resin layer, and the analysis was carried out in a temperature range of 25° C. to 800° C. and at a heating rate of 20° C./min under a nitrogen (N2) atmosphere of 60 cm$^3$/min 4. Measurement of Breakdown Voltage The breakdown voltage of the resin layer was evaluated according to ASTM D149 standard. The breakdown voltage means a voltage applied until the moment that a material loses insulation, and the insulation is lost by rapidly increasing conductivity at a high voltage equal to or higher than a certain level. The minimum voltage required to cause insulation breakdown is called the breakdown voltage, and the insulation is generated by completely conducting an arc through a specimen. A voltage gradient may be obtained by dividing the voltage at the moment of breakdown by the insulation thickness. The breakdown voltage was measured using a Backman Industrial PA70-1005/202 instrument, where the thickness of the specimen (resin layer) was about 2 mm and the diameter was about 100 mm 5. Adhesive Force Measurement A bottom plate of an aluminum module case, on which an insulating film (epoxy and/or polyester insulating layer) is formed, and a PET (poly(ethylene terephthalate)) film were attached using a resin layer, where the width to be attached was about 10 mm. At this time, the thickness of the resin layer was about 1 mm. The attachment is performed by loading the uncured resin composition between the insulating film and the PET film, and curing it. Thereafter, while peeling the PET film from the insulating side with a speed of about 300 mm/min and a peel angle of 180 degrees, the adhesive force is measured.

6. Measurement of Hardness

The hardness of the resin layer was measured according to ASTM D 2240 and JIS K 6253 standards. It was performed using Shore A, durometer hardness apparatus, where the initial hardness was measured by applying a load of 1 Kg or more (about 1.5 Kg) to the surface of the flat sample (resin layer) and the hardness was evaluated by identifying the measured value stabilized after 15 seconds.

7. Reliability Evaluation of Battery Module

The reliability of the battery module was evaluated by measuring the thermal resistance and temperature of the module. The thermal resistance of the battery module was evaluated by positioning the module between the upper and lower blocks of the measuring instrument, executing the DynTIM tester software of the controlling computer, determining the heating current and the measuring time on the software to input them, completing the setting of parameters such as the measurement pressure and the thermal resistance measurement conditions, and allowing the T3Ster and DynTIM tester controlled by the software to measure thermal resistance values based on the measurement conditions. The module temperature was measured by attaching a contact type thermometer based on location of the module. The thermal resistance and the module temperature were measured in a state of the bottom plate of the battery module in contact with the water cooling system. The reliability of each evaluation result was classified into the following criteria.

<Reliability Evaluation Criteria According to Thermal Resistance Evaluation>

Good: thermal resistance of 2.5 K/W or less

Fair: thermal resistance of more than 2.5 K/W up to 3 K/W

Poor: thermal resistance of more than 3 K/W

<Reliability Evaluation Criteria According to Module Temperature>

Good: temperature of 50° C. or less

Poor: temperature of more than 50° C.

Example 1

Preparation of Resin Composition

Alumina (particle size distribution: 1 µm to 60 µm) was mixed with a two-component type urethane adhesive composition (main component: HP-3753 (KPX Chemical), hardener: TLA-100 (manufactured by Asahi Kasei)) in an amount that the two-component type urethane adhesive composition can exhibit a thermal conductivity of about 3 W/mK after curing (in a range of about 600 to 900 parts by weight relative to 100 parts by weight of the two-component total solid content) to produce a resin composition having a viscosity at room temperature of about 250,000 cP, which was applied in manufacturing the following battery module.

Manufacture of Battery Module

Figure 2:
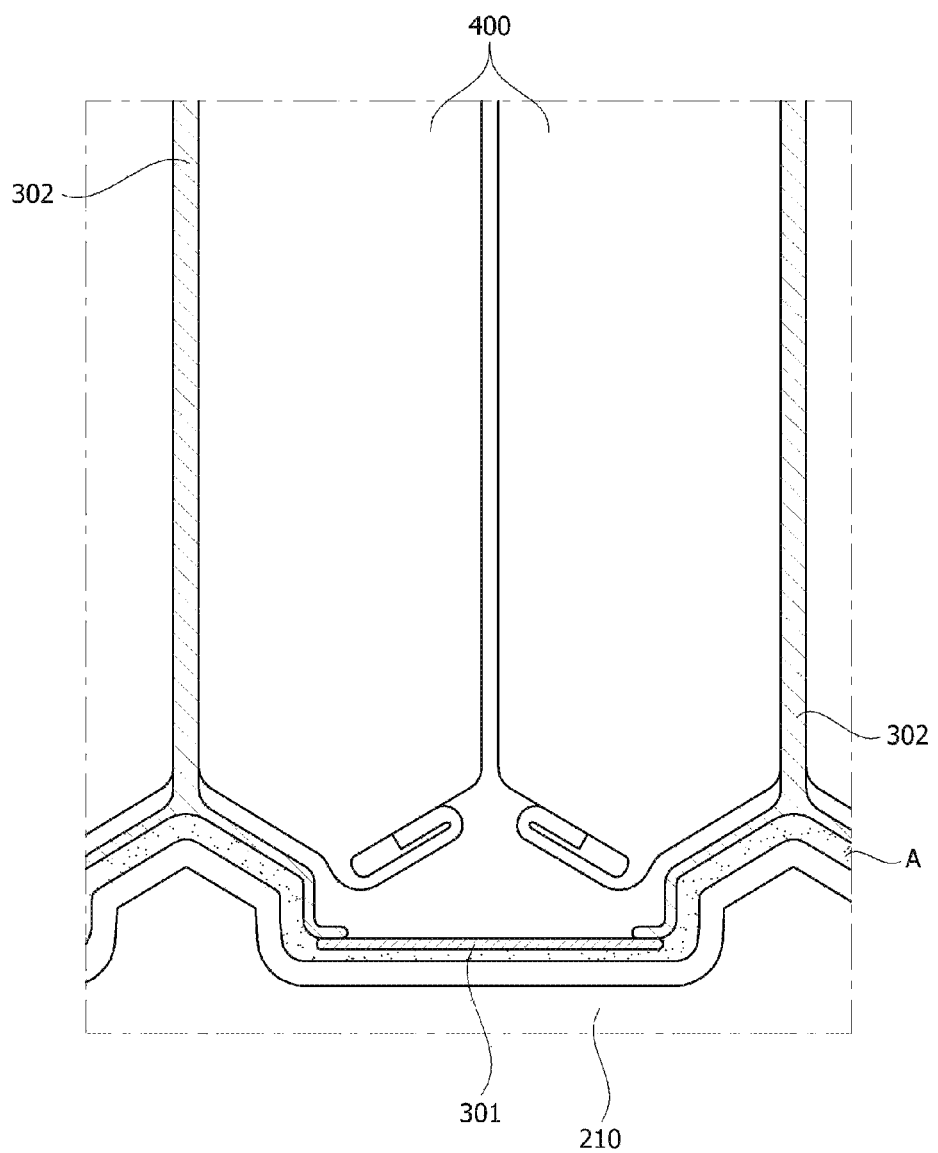
Figure 3:
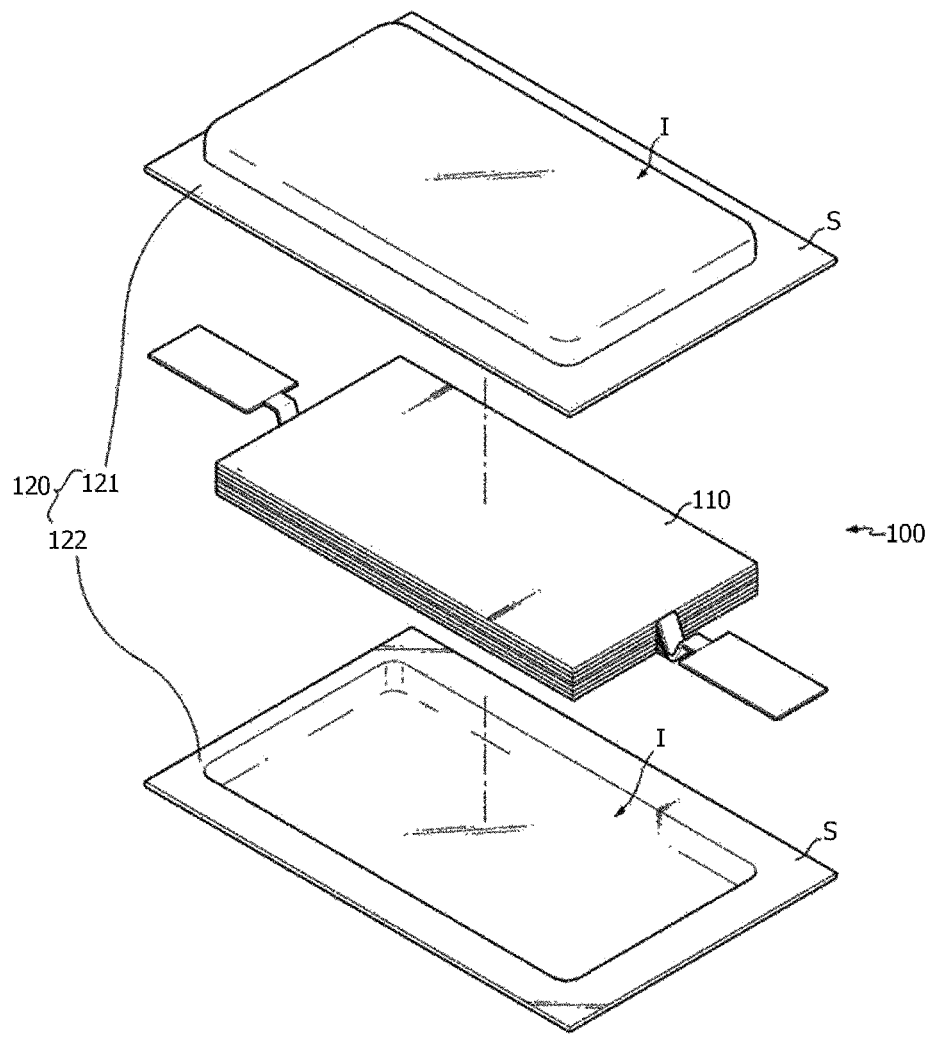
FIGS. 3 and 4 are views showing an exemplary pouch type battery.
Figure 4:
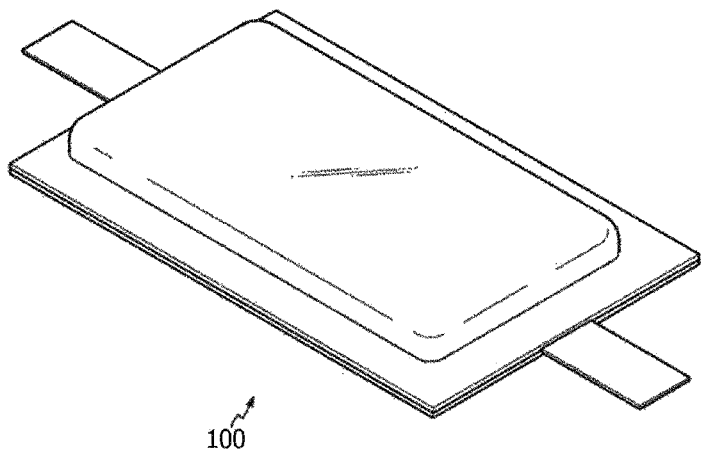

Using the prepared resin composition, a battery module having a shape as shown in FIG. 2 was produced. In the form of FIG. 2, the bottom plate (101), the cooling fins (201) and the cooling plate (202) were all made of aluminum. After coating the resin composition on the surface of the bottom plate so as to cover the entire bottom plate, the cooling fins and the cooling plate were mounted on the top of the bottom plate, respectively, the battery cells were mounted between the cooling fins mounted so as to cover the surface of the convex portion, and the resin composition was cured to prepare a battery module.

Example 2

Preparation of Resin Composition

Alumina (particle size distribution: 1 µm to 60 µm) was mixed with a two-component type silicone adhesive composition (main component: SL5100A (manufactured by KCC), hardener: SL5100B (manufactured by KCC)) in an amount that the two-component type silicone adhesive composition can exhibit a thermal conductivity of about 3 W/mK after curing (in a range of about 800 to 1200 parts by weight relative to 100 parts by weight of the two-component total solid content) to produce a resin composition having a viscosity at room temperature of about 130,000 cP, which was applied in manufacturing the following battery module.

Manufacture of Battery Module

A battery module was produced in the same manner as Example 1, except for using the prepared resin composition.

Example 3

A battery module was produced in the same manner as Example 1, except for using the resin composition prepared so as to have a viscosity at room temperature of about 350,000 cP by mixing alumina (particle size distribution: 1 µm to 60 µm) with a two-component type urethane adhesive composition (main component: PP-2000 (KPX Chemical), hardener: TLA-100 (manufactured by Asahi Kasei)) in an amount that the two-component type urethane adhesive composition can exhibit a thermal conductivity of about 3.5 W/mK after curing (in a range of about 600 to 900 parts by weight relative to 100 parts by weight of the two-component total solid content).

Example 4

A battery module was produced in the same manner as Example 1, except for using the resin composition prepared so as to have a viscosity at room temperature of about 500,000 cP by mixing alumina (particle size distribution: 1 µm to 60 µm) with an ambient temperature curable type epoxy adhesive composition obtained from Kukdo Chemical in an amount that the adhesive composition can exhibit a thermal conductivity of about 3 W/mK after curing (in a range of about 600 to 900 parts by weight relative to 100 parts by weight of the two-component total solid content).

Example 5

A battery module was produced in the same manner as Example 1, except for using the resin composition prepared so as to have a viscosity at room temperature of about 150,000 cP by mixing alumina (particle size distribution: 1 µm to 60 µm) with a two-component type urethane adhesive composition (main component: PP-2000 (KPX Chemical), hardener: TLA-100 (manufactured by Asahi Kasei)) in an amount that the two-component type urethane adhesive composition can exhibit a thermal conductivity of about 2 W/mK after curing (in a range of about 400 to 900 parts by weight relative to 100 parts by weight of the two-component total solid content).

Example 6

A battery module was produced in the same manner as Example 5, provided that the module was produced by covering about 50% of the bottom plate area with the resin composition.

Comparative Example 1

A battery module was produced in the same manner as Example 2, except for using the resin composition prepared so as to have a viscosity at room temperature of about 2,000,000 cP by mixing graphite with a two-component type silicone adhesive composition (main component: SL5100A (manufactured by KCC), hardener: SL5100B (manufactured by KCC)) in an amount that the two-component type silicone adhesive composition can exhibit a thermal conductivity of about 1.5 W/mK after curing (in a range of about 100 to 300 parts by weight relative to 100 parts by weight of the two-component total solid content).

Comparative Example 2

A battery module was produced in the same manner as Example 2, except for using the resin composition prepared so as to have a viscosity at room temperature of about 100,000 cP by mixing alumina (particle size distribution: 1 μm to 60 μm) with a two-component type silicone adhesive composition (main component: SL5100A (manufactured by KCC), hardener: SL5100B (manufactured by KCC)) in an amount that the two-component type silicone adhesive composition can exhibit a thermal conductivity of about 1.5 W/mK after curing (in a range of about 300 to 500 parts by weight relative to 100 parts by weight of the two-component total solid content).

Comparative Example 3

A battery module was produced in the same manner as Example 1, except that the resin composition was not used, that is, the resin layer was not formed.

The physical properties of the resin layer and the reliability of the battery module measured for the above Examples and Comparative Examples are summarized in Tables 1 and 2 below.

TABLE 1

| | | Example | | | | | |
|---|---|---|---|---|---|---|---|
| | | 1 | 2 | 3 | 4 | 5 | 6 |
| Resin Layer | Thermal Conductivity(W/mK) | 3 | 3 | 3.5 | 3 | 2 | 2 |
| | Specific Gravity | 3.1 | 3.1 | 3.2 | 3.2 | 2.6 | 2.6 |
| | Residue at 800° C. (% by weight) | >80 | >80 | >80 | >80 | ca. 50 | ca. 50 |
| | Adhesive Force(gf/10 mm) | 500 | 100 | 450 | 600 | 500 | 500 |
| | Hardness(Shore A) | 90 | 60 | 90 | 100 | 70 | 70 |
| | Breakdown Voltage(kV/mm) | 15 | 11 | 10 | <8 | 4 | 4 |
| Reliability (thermal resistance) | | good | good | good | good | fair | fair |
| Reliability (module temperature) | | good | good | good | good | Good | good |

TABLE 2

| | | Comparative Example | | |
|---|---|---|---|---|
| | | 1 | 2 | 3 |
| Resin Layer | Thermal Conductivity(W/mK) | 1.5 | 1.5 | — |
| | Specific Gravity | 2 | 2 | — |
| | Residue at 800° C. (% by weight) | ca. 60 | ca. 60 | — |
| | Adhesive Force(gf/10 mm) | 80 | 90 | — |
| | Hardness(Shore A) | 40 | 40 | — |
| | Breakdown Voltage(kV/mm) | 2 | 5 | — |
| Reliability (thermal resistance) | | poor | poor | poor |
| Reliability (module temperature) | | poor | poor | poor |

From the results of Tables 1 and 2, it can be seen that the physical properties of the resin layer are changed by the kind of resin used in the resin layer, and the kind and ratio of the filler, and thus the reliability of the module is affected.

For example, when comparing the results of Examples 1, 2 and 4, it can be seen that the adhesive force on adding alumina in order to secure the same level of thermal conductivity, increases in the order of epoxy, urethane and silicone adhesives, and the hardness increases in the order of epoxy, urethane and silicone adhesives, and it can be confirmed that the specific gravity and the heat resistance (TGA analysis result) are adjusted to a similar level.

In addition, when comparing the results of Examples 1, 3 and 5, it can be confirmed that when the same series of resins have been used, thermal conductivity, specific gravity, heat resistance (TGA analysis result), hardness, and the like are changed depending on the kind and content of the filler. For example, in Example 5, in which a small amount of filler was applied compared to Examples 1 and 3, the thermal conductivity and the specific gravity showed somewhat low values, the heat resistance (TGA analysis) was lowered, the adhesive force was in a similar level, but the hardness was lowered, and the breakdown voltage was lowered as the ratio of the filler influencing on securing insulation was lowered.

The invention claimed is:
1. A battery module comprising:
a module case having a bottom plate;
a plurality of battery cells; and
a resin layer,
wherein at least two convex portions for guiding the battery cells are formed on the bottom plate,
wherein each of the plurality of battery cells is disposed in a location between adjacent ones of the at least two convex portions,
wherein the battery module further comprises either:
(a) a plurality of cooling plates, wherein each of the plurality of cooling plates is disposed in a location between adjacent ones of the at least two convex portions and between said battery cells and a surface of the bottom plate, the surface being between adjacent ones of the at least two convex portions, wherein the resin layer fills a space between the bottom plate and each of the plurality of cooling plates disposed in a location between adjacent ones of the at least two convex portions; or (b) a cooling fin disposed in a location between adjacent ones of the plurality of battery cells and positioned on one of the at least two convex portions so as to cover an upper surface of the convex portion, wherein an end portion of the cooling fin facing the one of the at least two convex portions has a shape conforming to the convex portion such that the end portion of the cooling fin extends outward along opposing surfaces of the convex portion, wherein the resin layer is positioned between the convex portion and the end portion of the cooling fin while being in contact with said end portion of the cooling fin and said convex portion.

2. The battery module according to claim 1, wherein the bottom plate comprises a region having a thermal conductivity of 10 W/mK or more.

3. The battery module of claim 1, wherein the bottom plate is in thermal contact with a cooling medium and the resin layer.

4. The battery module according to claim 1, wherein the resin layer covers an area of 10% or more of the entire area of the bottom plate.

5. The battery module according to claim 1, wherein the resin layer has a thermal conductivity of 2 W/mK or more.

6. The battery module according to claim 1, wherein the resin layer has a breakdown voltage of 10 kV/mm or more.

7. The battery module according to claim 1, wherein the resin layer has a specific gravity of 5 or less.

8. The battery module according to claim 1, wherein the resin layer has an 800° C. remaining amount of at least 70% by weight in a thermogravimetric analysis (TGA).

9. The battery module according to claim 1, wherein the resin layer comprises an acrylic resin, an epoxy resin, a urethane resin, an olefin resin, an EVA resin, or a silicone resin.

10. The battery module according to claim 1, wherein the resin layer comprises fillers.

11. The battery module according to claim 10, wherein the fillers are ceramic particles or carbon-based fillers.

12. The battery module according to claim 1, wherein the resin layer comprises a thixotropic agent, a diluent, a dispersant, a surface treatment agent, a flame retardant, or a coupling agent.

13. A battery pack comprising at least two battery modules of claim 1, wherein said at least two battery modules are electrically connected to each other.

14. An automobile comprising the battery module of claim 1.

15. An automobile comprising the battery pack of claim 13.

16. A battery module comprising:
a module case having a bottom plate;
a plurality of battery cells; and
a resin layer,
wherein at least two convex portions for guiding the battery cells are formed on the bottom plate,
wherein each of the plurality of battery cells is disposed in a location between adjacent ones of the at least two convex portions,
wherein the battery module further comprises:
a cooling plate disposed in a location between adjacent ones of the at least two convex portions and between said battery cells and a surface of the bottom plate, the surface being between adjacent ones of the at least two convex portions, wherein the resin layer fills a space between the bottom plate and the cooling plate disposed in a location between adjacent ones of the at least two convex portions; and
a cooling fin disposed in a location between adjacent ones of the plurality of battery cells and positioned on one of the at least two convex portions so as to cover an upper surface of the convex portion, wherein the resin layer is positioned between the convex portion and the cooling fin while being in contact with said cooling fin and said convex portion,
wherein the cooling plate and the cooling fin are in direct contact.

17. The battery module according to claim 16, wherein when the battery module comprises the cooling fin, the cooling fin has a thermal conductivity of 10 W/mK or more, and when the battery module comprises the cooling plate, the cooling plate has a thermal conductivity of 10 W/mK or more.

18. A battery module comprising:
a module case having a bottom plate;
a plurality of battery cells; and
a resin layer,
wherein a plurality of convex portions for guiding the battery cells are formed on the bottom plate,
wherein each of the plurality of battery cells is disposed in a location between adjacent ones of the plurality of convex portions,
wherein the battery module further comprises:
a plurality of cooling plates each respectively disposed in a location between adjacent ones of the a plurality of convex portions and between said battery cells and a surface of the bottom plate, the surface being between adjacent ones of the plurality of convex portions; and
a plurality of cooling fins each respective disposed in a location between adjacent ones of the plurality of battery cells and positioned on one of the plurality of convex portions so as to cover an upper surface of the respective convex portion,
wherein the resin layer fills spaces between the bottom plate and the plurality of cooling plates and is positioned between the plurality of convex portion and the plurality of cooling fins while being in contact with said plurality of cooling fins and said plurality of convex portions, and
wherein each of the plurality of cooling plates is in direct contact with two of the plurality of cooling fins.

* * * * *